July 30, 1968　　　J. H. THORP　　　3,394,418
BOOK CASING-IN MACHINE
Filed Aug. 10, 1966　　　11 Sheets-Sheet 4

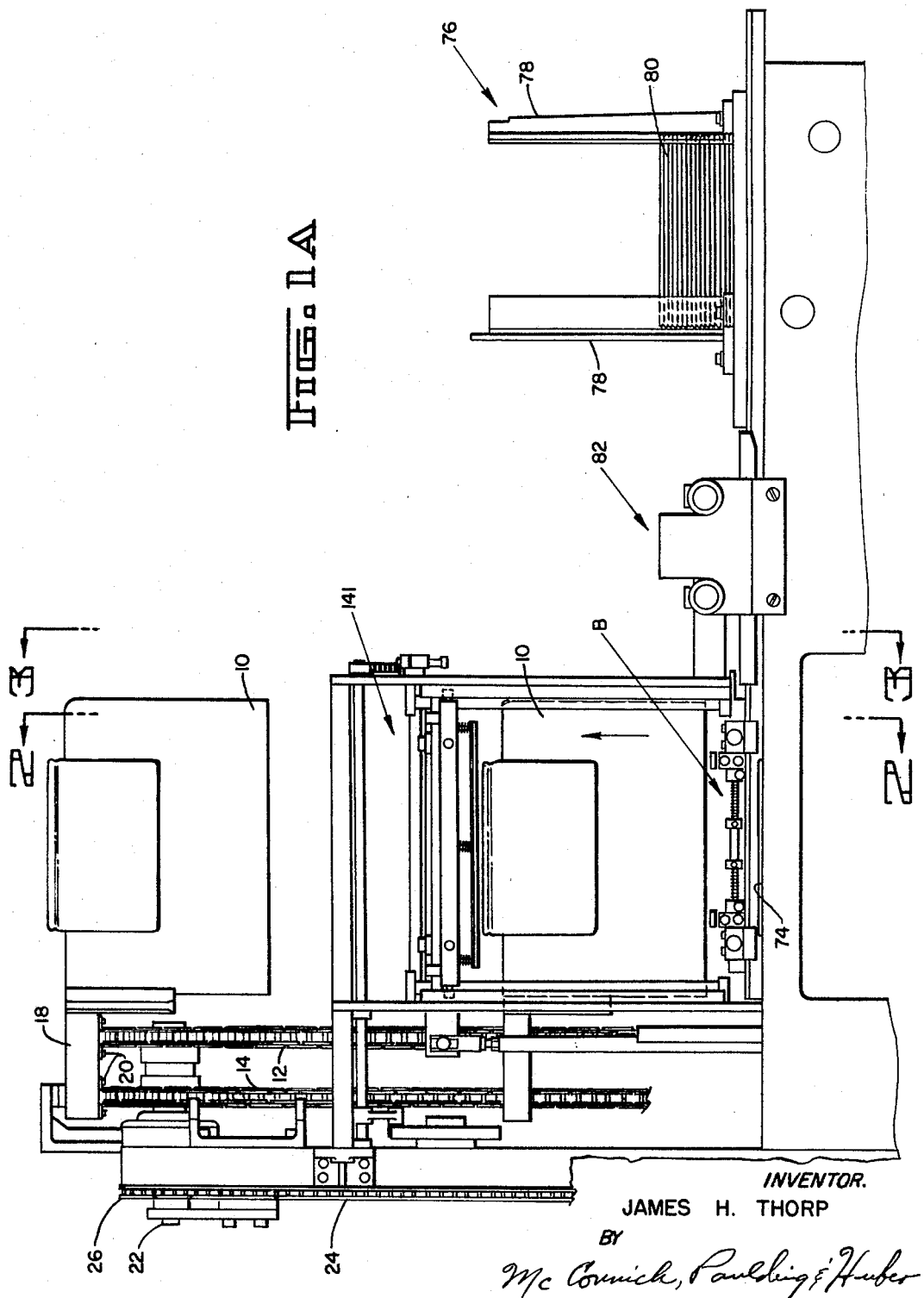

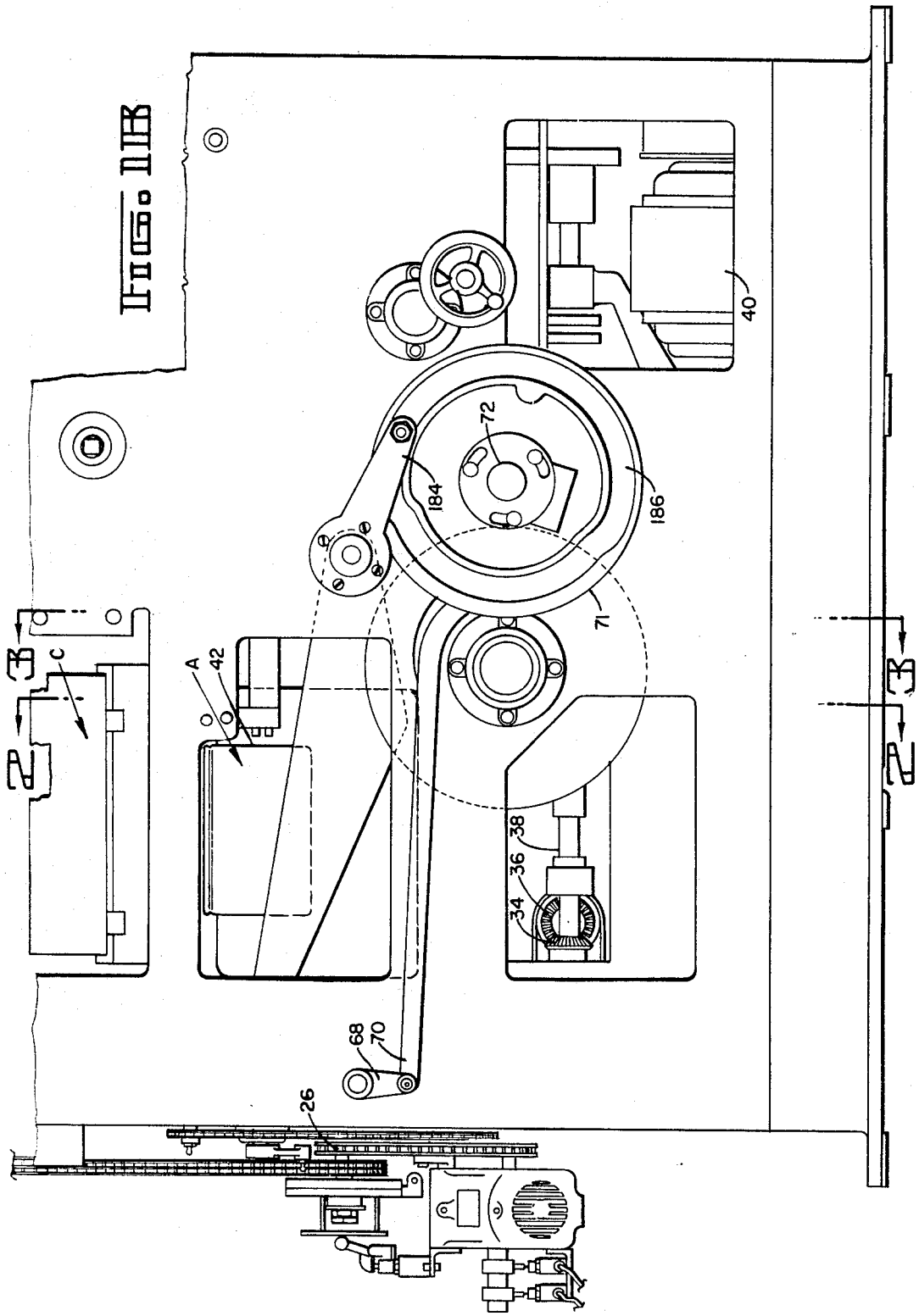

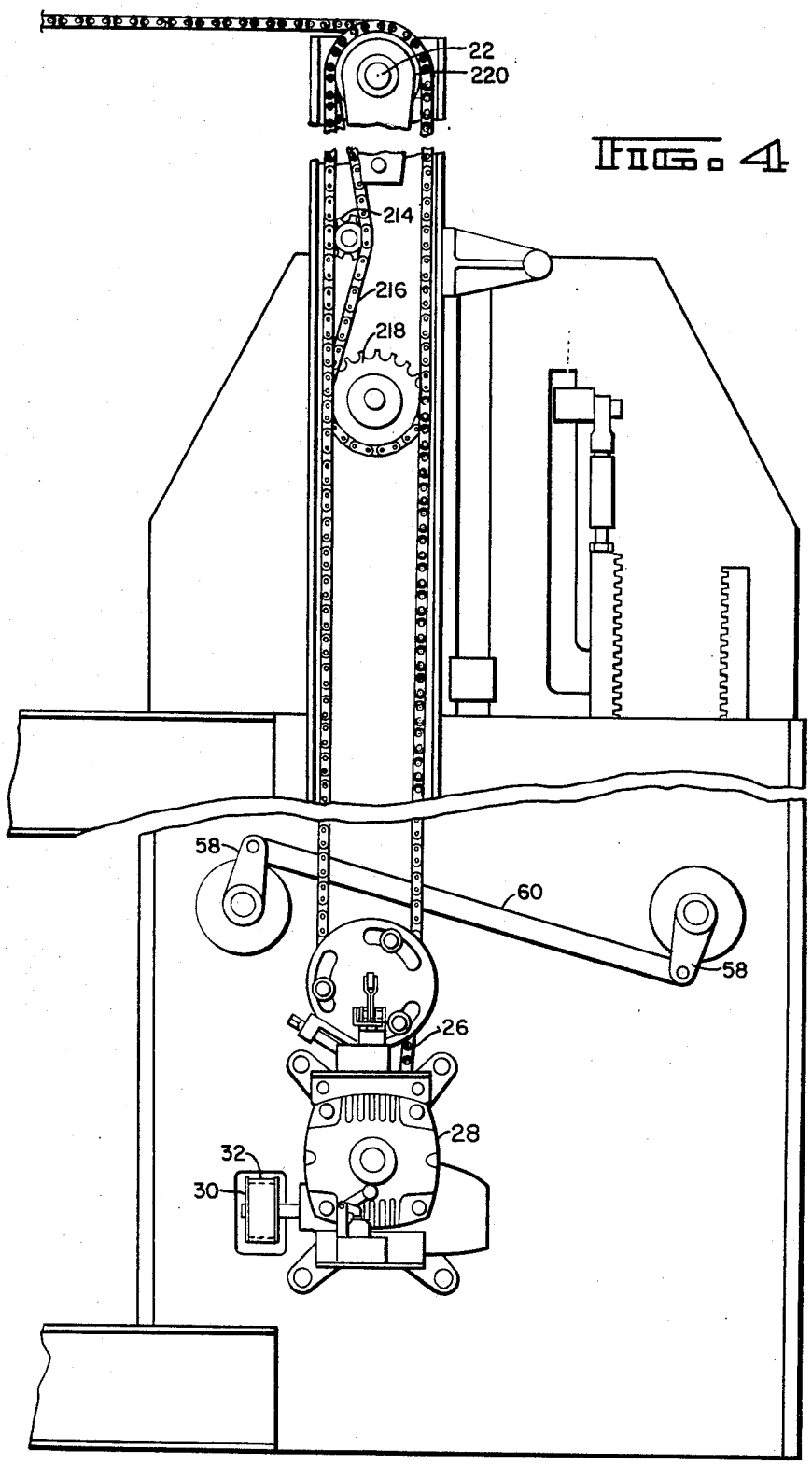

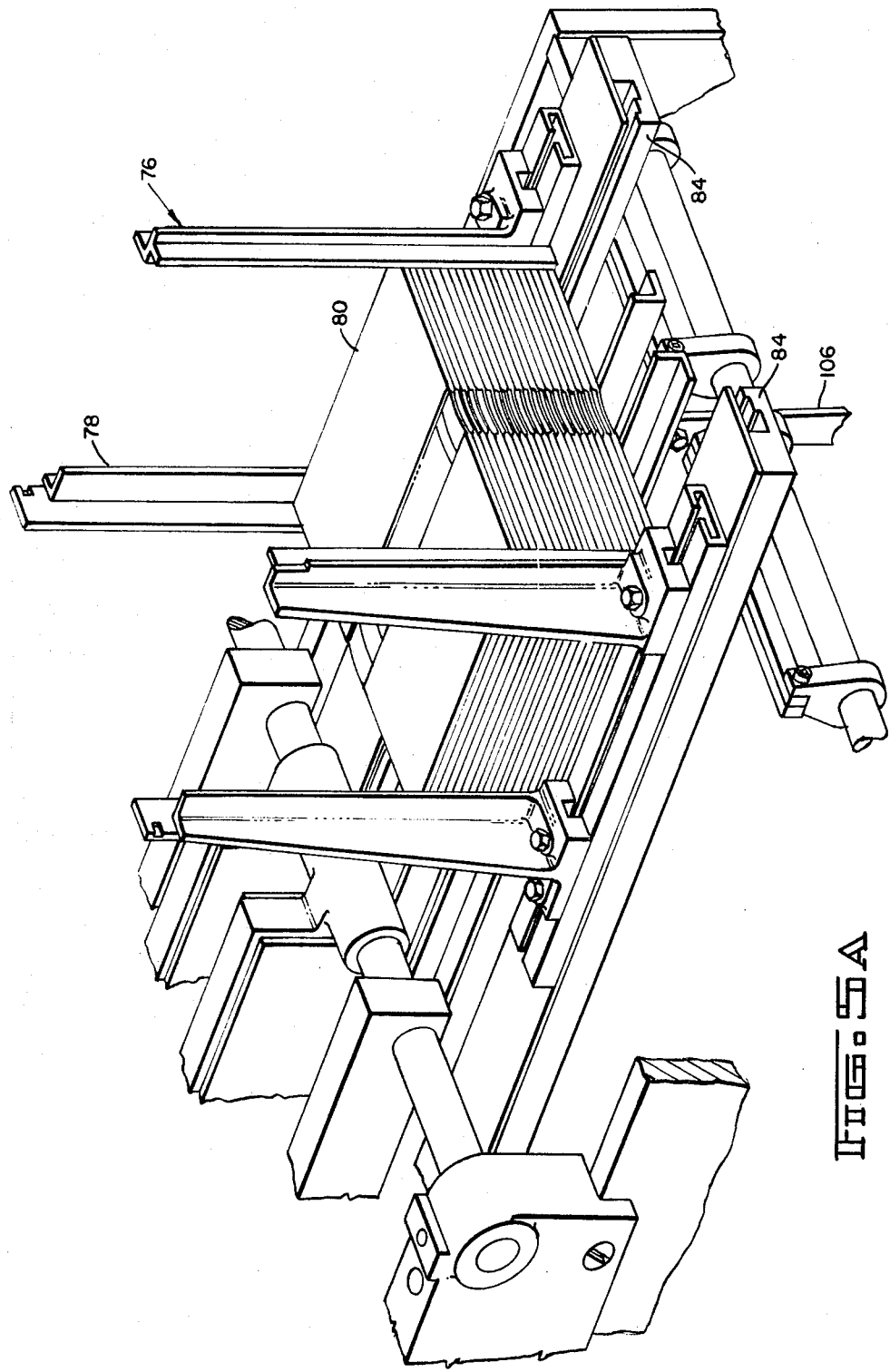

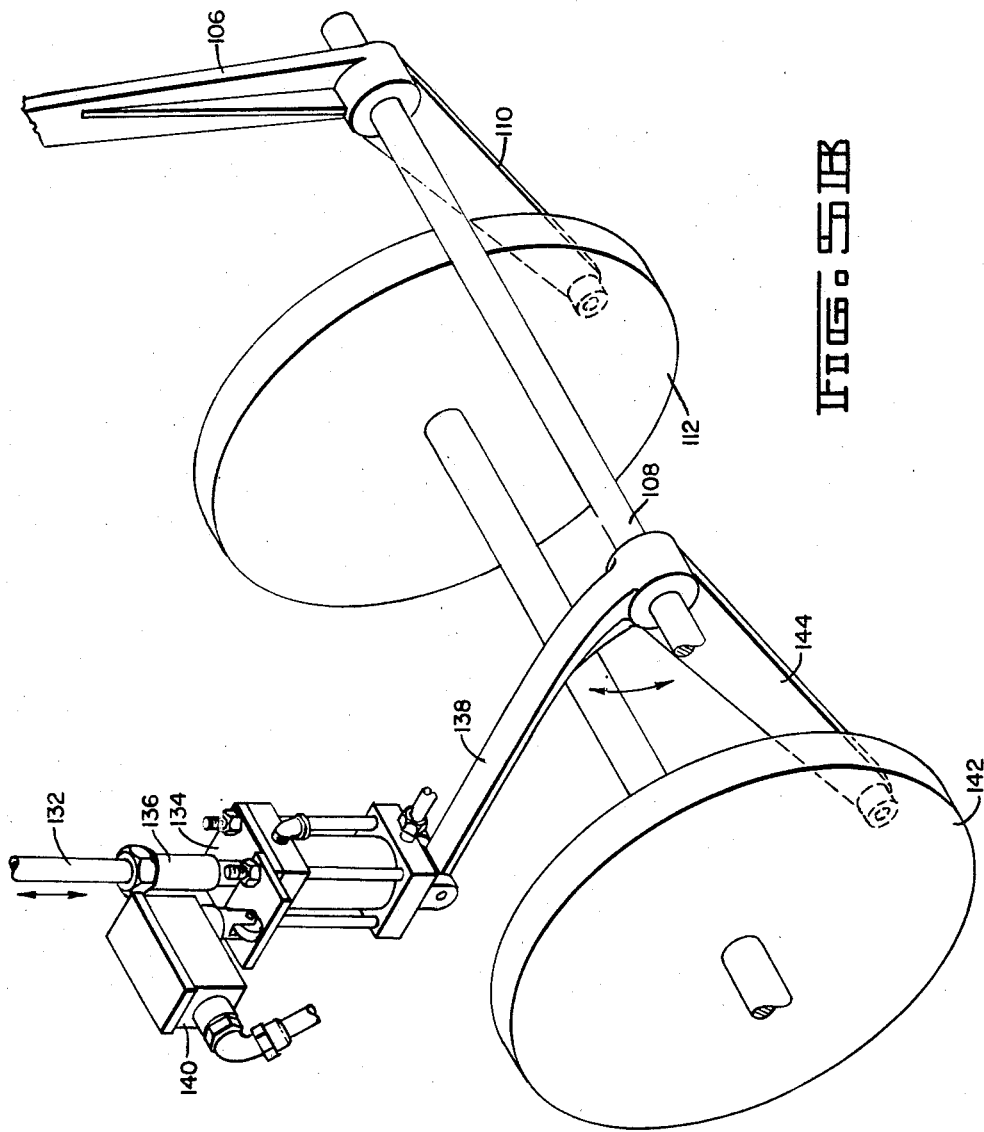

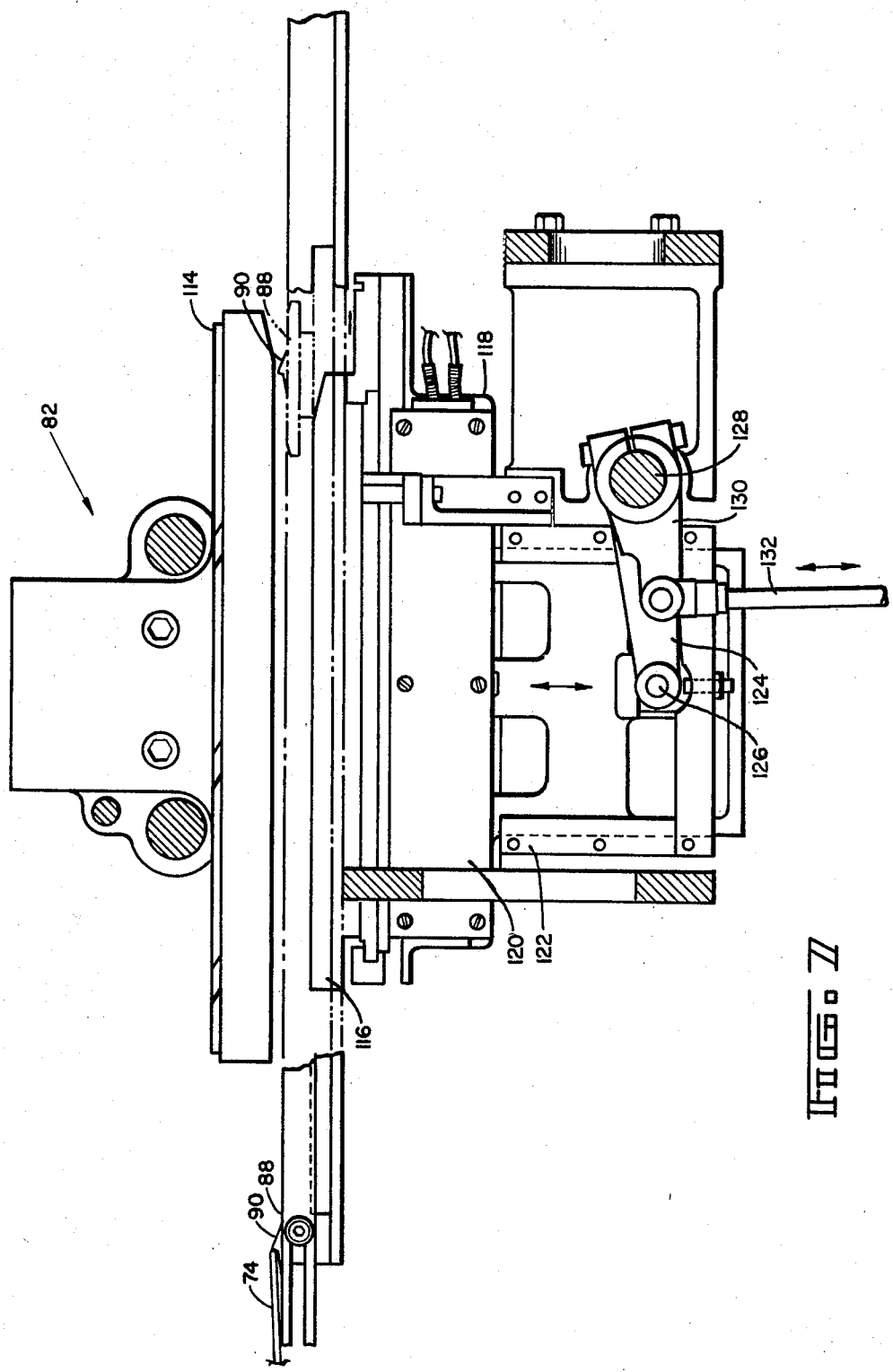

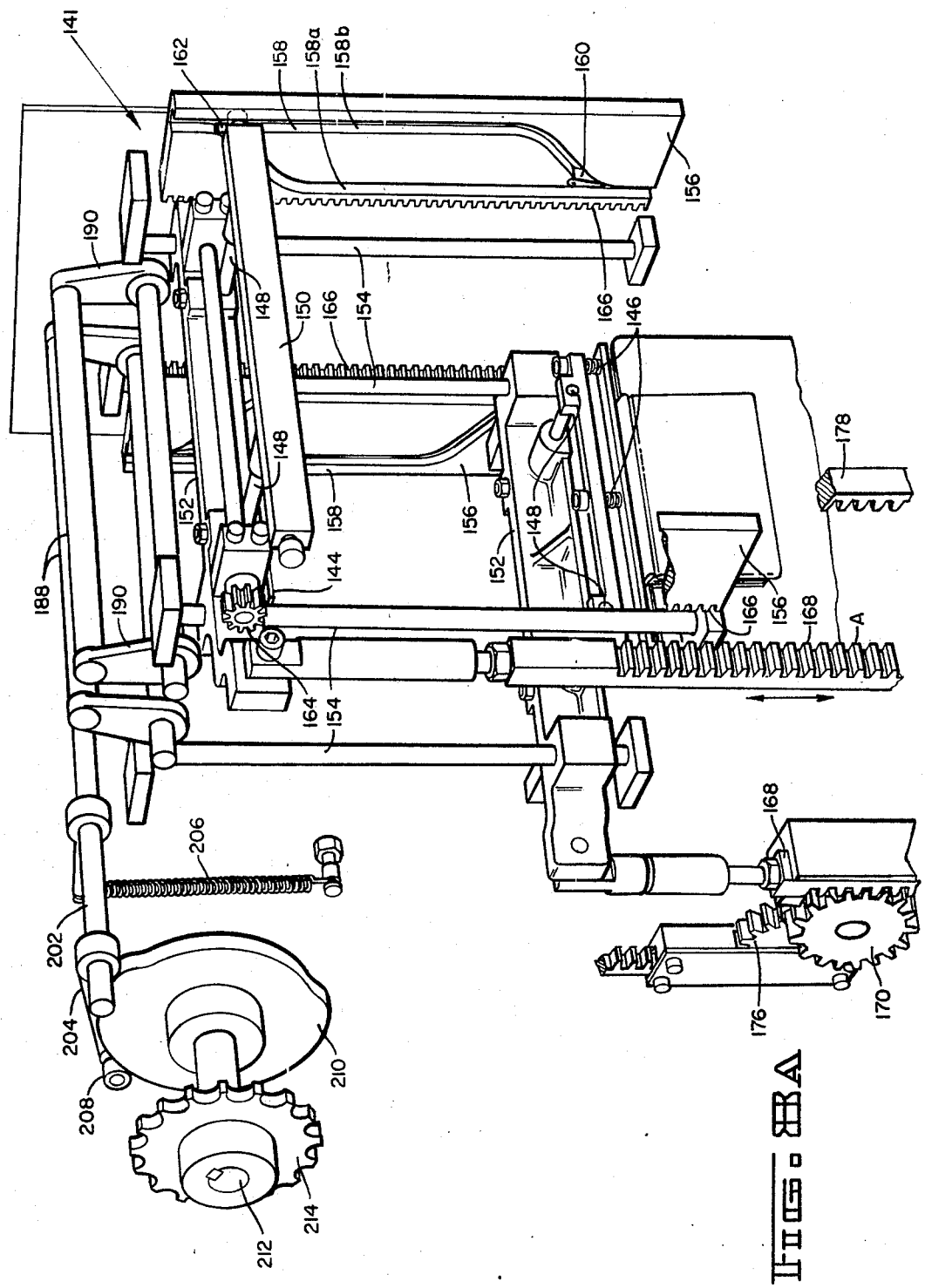

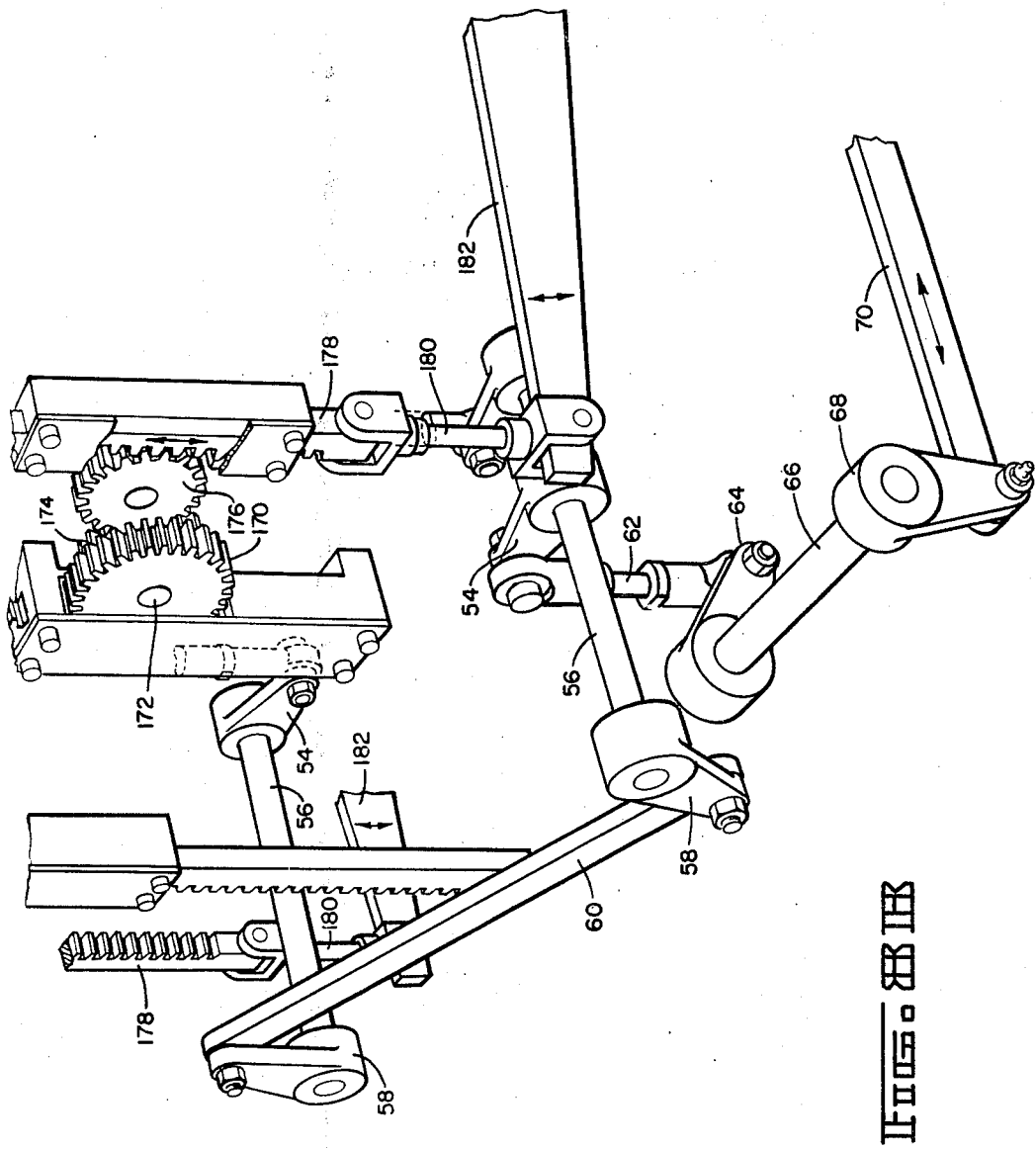

United States Patent Office 3,394,418
Patented July 30, 1968

3,394,418
BOOK CASING-IN MACHINE
James H. Thorp, West Hartford, Conn., assignor to The Smyth Manufacturing Company, Bloomfield, Conn., a corporation of Connecticut
Filed Aug. 10, 1966, Ser. No. 571,571
10 Claims. (Cl. 11—3)

ABSTRACT OF THE DISCLOSURE

A book casing-in machine having saddle plates movable upwardly in series and with fillers thereon through an assembly station where cases are held and successively folded downwardly about the fillers by the upward movement of the latter. A book squaring device adjacent the assembly station has book engaging elements movable in the manner of an "Australian Crawl" to alternately engage assembled book backs and maintain cases and liners in proper registry.

---

This invention relates to a book casing-in machine adapted to handle book components comprising book fillers and cases and to assemble and adhesively secure such components in succession to form books.

It is the general object of the present invention to provide a high speed book casing-in machine which assembles book components comprising fillers and cases at a more rapid rate than has heretofore been possible and which yet accomplishes component assembly and precise filler and case registry with a high degree of accuracy and efficiency.

A further and more specific object of the invention resides in the provision of a high speed book casing-in machine which includes a book squaring device operable to effect and to maintain a condition of precise filler and case registry at a critical phase in the book casing-in operation; that is, immediately following initial filler and case interengagement and assembly.

The drawings show a preferred embodiment of the invention and such embodiment will be described, but it will be understood that various changes made made from the construction disclosed, and that the drawings and description are not to be construed as defining or limiting the scope of the invention, the claims forming a part of this specification being relied upon for that purpose.

Of the drawings:

FIG. 1A illustrates somewhat schematically and in side elevation an upper portion of a book casing-in machine constructed in accordance with the present invention.

FIG. 1B illustrates somewhat schematically and in side elevation a lower portion of the book casing-in machine and is to be viewed in association with and arranged immediately beneath FIG. 1A.

FIG. 4 is a fragmentary somewhat schematic rear view of the book casing-in machine.

FIG. 5A is an enlarged somewhat schematic perspective and fragmentary view showing a portion of the book casing-in machine comprising a book case hopper and a case feed mechanism.

FIG. 5B is an enlarged somewhat schematic perspective and fragmentary view illustrating certain of the operating means for the case feed mechanism and a case forming mechanism, the said view being intended for viewing in association with and arranged immediately beneath 5A.

FIG. 7 is an enlarged somewhat schematic sectional view taken through a case forming mechanism.

FIG. 8A is an enlarged somewhat schematic perspective and fragmentary view showing a book squaring device incorporated in the book casing-in machine.

FIG. 8B is an enlarged somewhat schematic perspective and fragmentary view showing operating means for the book squaring device, the said view being intended for viewing with and arranged immediately beneath FIG. 8A.

Referring particularly to FIGS. 1A, 1B, 2 and 3, it will be observed that the book casing-in machine of the present invention comprises a plurality of saddle plates 10, 10 each of which is adapted to support a book filler or an assembled book comprising a filler and a case in a back-up attitude and astride an upper portion of the plate. That is, each of the saddle plates 10, 10 is arranged in a vertical plane so that a book filler or assembled filler and case can be split and spread apart slightly approximately at its center leaves so as to rest astride the plate. In accordance with the invention, the saddle plates 10, 10 are adapted to be moved upwardly in a generally vertical path through an Assembly Station by a conveyor means and, more specifically, a conveyor means is provided to move the saddle plates in a vertical plane through a generally rectangular and a horizontal-vertical path which has a vertically ascending run thereof arranged to pass through the Assembly Station. In the embodiment of the invention shown, the conveyor means comprises first and second or front and rear endless sprocket chains 12 and 14 and the saddles plates 10, 10 are arranged in spaced series along the chain and are pivotally attached in cantilever fashion at upper portions thereto so as to depend from the chains continuously and in a substantially vertical plane.

Figure 2:
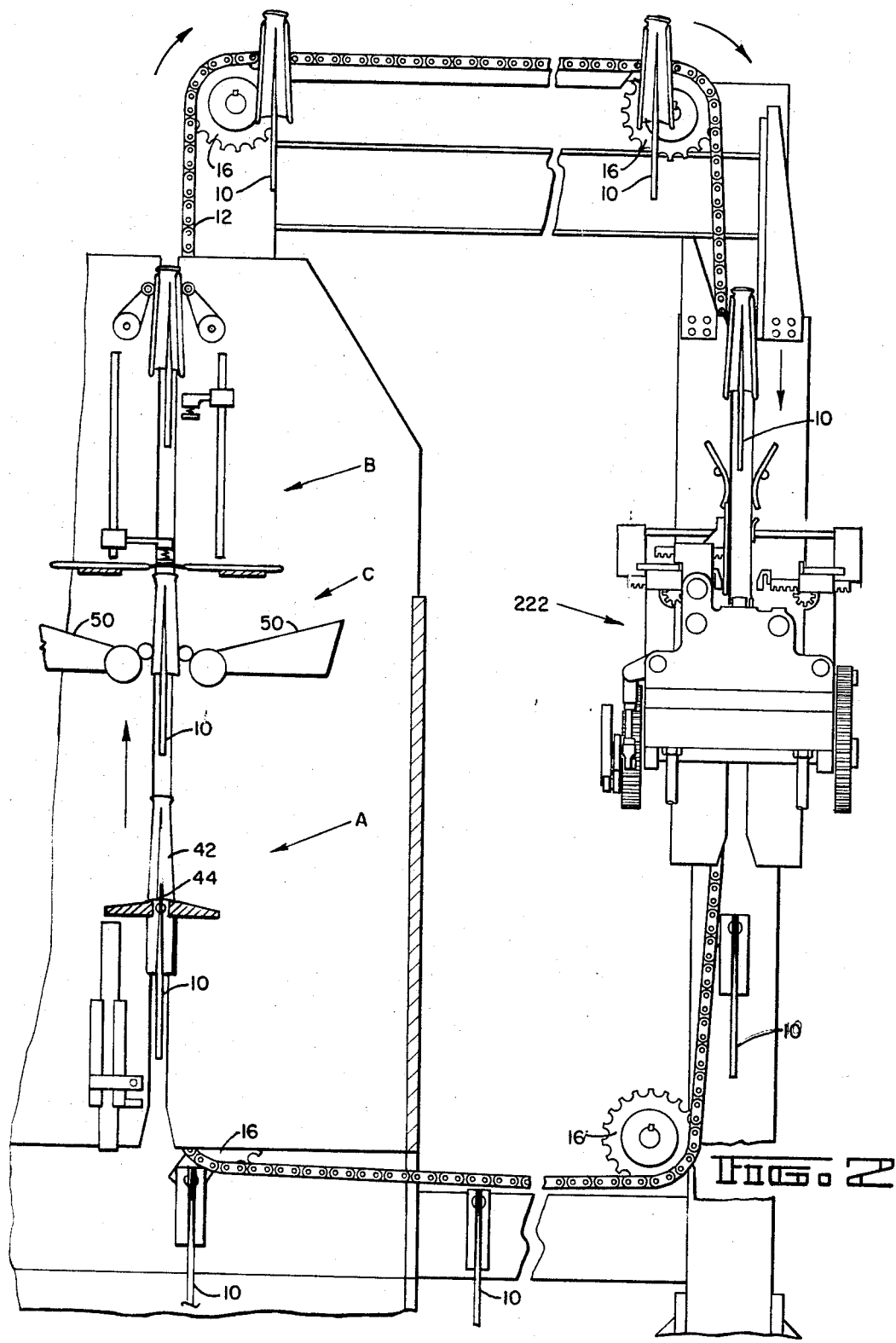
FIG. 2 is a somewhat vertical section of the book casing-in machine taken generally as indicated by the lines 2—2 in FIG. 1.

In FIG. 2 the front chain 12 is shown supported at four rectangularly spaced locations by appropriate sprockets 16, 16 for clockwise movement under the urging of the sprocket 16 at the upper left. The pivotal connection of the saddle plates to the chains 12 and 14 is best illustrated in FIG. 1A where a plate 10 is shown pivotally mounted on a pivot block 18 which extends between front and rear chains 14 and which is secured thereto by suitable screw and bracket connections 20, 20. A shaft 22 extends horizontally to support the conveyor chain sprocket 16 and at the rear end of the machine a vertically extending drive chain 24 is engaged with a sprocket 26 on the shaft 22 whereby to drive the same and to effect clockwise conveyor chain movement as mentioned. The chain 24 extends downwardly at the rear of the machine and is in turn driven from a suitable sprocket connection by a chain 26 driven from a speed reducer 28. The reducer 28 is in turn driven by a pulley 30 having an associated belt 32 best shown in FIG. 4. The belt 32 is driven through bevel gears 34, 36, FIG. 1B and a drive shaft 38 which in turn receives power through suitable connection with a drive motor 40.

As mentioned above, the conveyor chain moves through its generally rectangular path in a vertical plane and in a clockwise direction whereby the transport book fillers and/or assembled fillers and cases on the saddle plates 10, 10. In the casing-in machine shown a first book component comprising a filler 42 is shown at a Filler Loading Station A in FIG. 1B and in FIG. 2. Book filler advancing means is not shown and is deemed unnecessary for a full understanding of the invention. In slow speed operation of the machine it will be apparent that fillers can be loaded on the saddle plates 10, 10 manually but it is, of course, the preferred practice to employ a high speed filler feed or advancing means for conveying fillers such as 42 in succession to the loading station A preferably with glue or adhesive applied at the back and joint areas thereof. At the Station A a filler such as 42 is spread apart slightly at its center leaves by means of a two-part splitter 44 adapted for the upward passage of saddle plates 10, 10 therethrough. As a saddle plate 10 moves upwardly through the splitter 44 and between the center leaves of a filler 42, the filler is properly registered thereon and is carried upwardly thereby for subsequent gluing operation and for assembly with a case at an Assembly Station B.

Figure 3:
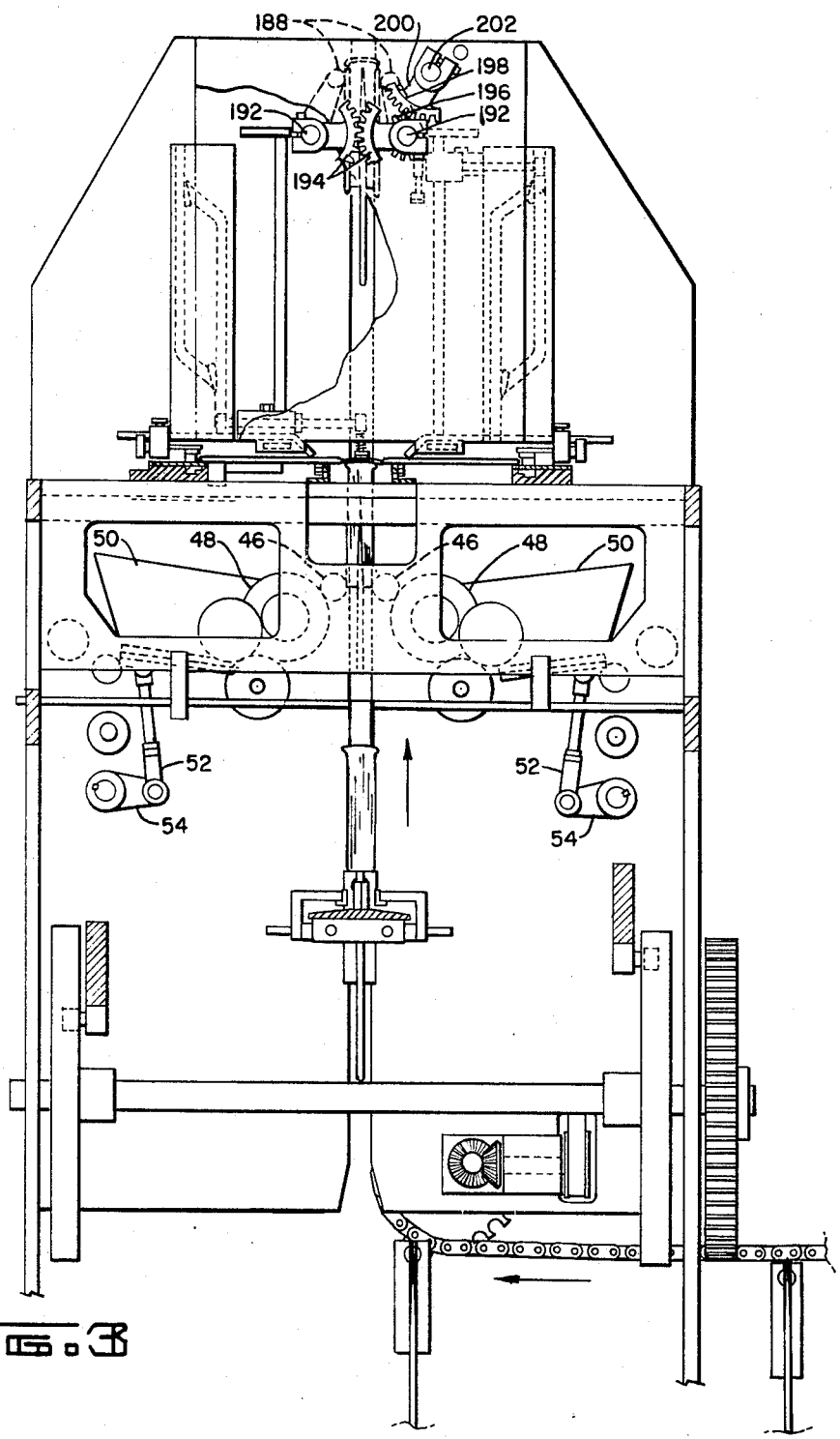
FIG. 3 is an enlarged somewhat schematic vertical section through the book casing-in machine taken generally as indicated at 3—3 in FIG. 1.

In movement upwardly from the Loading Station A to the Assembly Station B on a saddle plate 10, a filler is preferably treated at its sides with paste or glue prior to the assembly of the same with a case at the Assembly Station. In FIG. 1B a gluing Station C is indicated generally and glue applying rolls at the station are best illustrated in FIG. 3 at 46, 46. That is, glue rolls 46, 46 are disposed at opposite sides of a filler such as 42 as it is conveyed upwardly and they are moved toward and away from the filler in passage of the latter therebetween whereby to apply glue or paste to the sides thereof. Similar glue or paste supply rolls 48, 48 have associated glue reservoirs 50, 50 and each of the reservoirs is pivotally supported so as to be swung about a horizontal axis at an inner portion thereof and to thereby move its associated supply roll 48 and glue roll 46 arcuately inwardly into engagement with a filler and then outwardly out of engagement as the filler passes upwardly. Push rods 52, 52 are associated with outer portions of the glue reservoirs 50, 50 whereby to pivot the same arcuately upwardly and inwardly at the said outer portions and each of said rods has an associated crank arm 54.

Referring now particularly to FIG. 4 and to FIG. 8B it will be observed that the crank arms 54, 54 have associated pivot shafts 56, 56 which extend to synchronizing crank arms 58, 58 tied together by connecting link 60. As will be apparent, the synchronizing crank arms 58, 58 and the link 60 insure that the push rods 52, 52 operate to tilt the paste boxes or reservoirs 50, 50 in unison whereby to move the paste rolls 46, 46 in unison into engagement with a filler therebetween. A single drive means is preferably provided and a rod 62 as best shown in FIG. 8B adapted for movement generally vertically at the urging of a craank arm 64 turned through a short pivot shaft 66, a crank arm 68, and a connecting rod 70 which extends from the arm 68 to a cam 71 on a main drive shaft 72, FIG. 1B. The shaft 72 is, of course, appropriately connected for receipt of driving power from the motor 40 and a suitable roller on the rod 70 cooperates with a cam track on the inner side of the cam whereby to effect operation of the paste rolls 46, 46 and the driving mechanism in properly timed relationship with the upward movement of the fillers therebetween.

When a filler arrives at the Assembly Station B its back, joint and side areas are pasted and ready for assembly with a case such as the case 74 shown at the Assembly Station. Cases are advanced from right to left or from front to rear in the casing-in machine to the Assembly Station B in a back-up and generally flat condition so as to be engaged by a filler and to fold downwardly thereabout as the filler is moved upwardly through the Assembly Station on a saddle plate. In FIGS. 1A and 5A there is shown a case hopper indicated generally by the reference numeral 76 which comprises four case engaging and supporting upright elements 78, 78 adapted to accommodate a vertical stack of cases 80. The cases in the stack 80 are loaded in the hopper 76 in a back-up and generally flat condition and are advanced one at a time from the bottom of the stack leftwardly to a case forming mechanism indicated generally at 82. From the case forming mechanism 82, a case is advanced leftwardly and generally horizontally to the aforesaid Assembly Station B.

Figure 6:
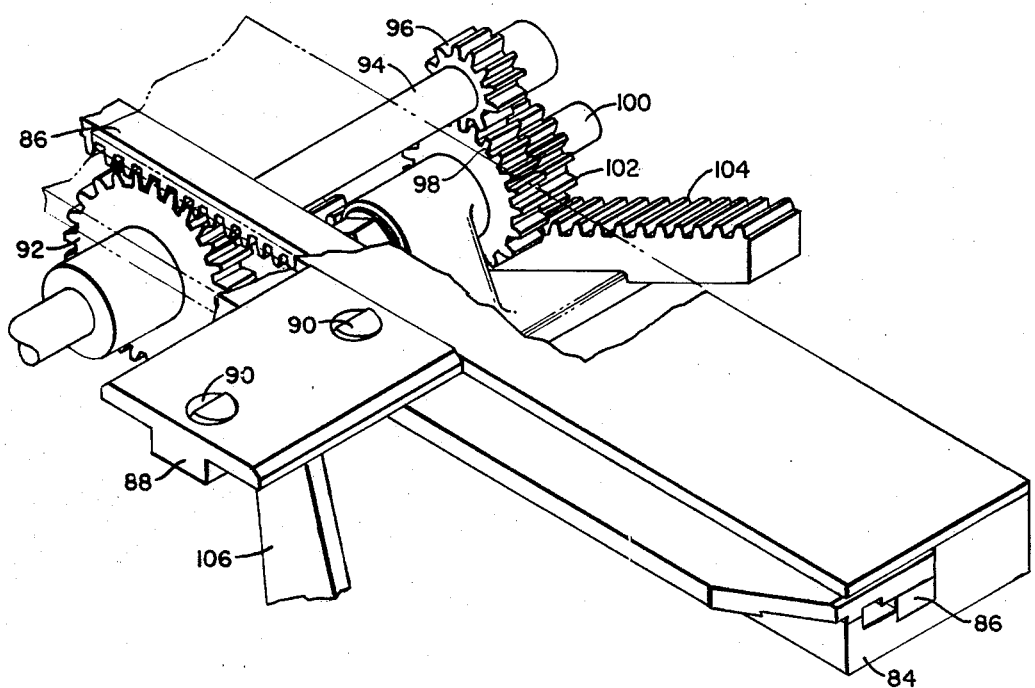
FIG. 6 is an enlarged somewhat schematic and perspective view further illustrating the case feed mechanism.

As best illustrated in FIGS. 5A, 5B, 6 and 7, horizontal rack support and guide elements are provided at 84, 84 for receiving and supporting horizontally reciprocable racks 86, 86 best shown in FIGS. 5A and 6. Each of the horizontally reciprocal racks 86, 86 carries a case pusher plate 88 (one shown) which in turn supports a case feed button 90 which is spring biased upwardly from the pusher plate and which engages a trailing edge of the lowermost case in the case hopper whereby to urge the case rearwardly or to the left in the machine as the associated rack 86 and pusher plate 88 are so moved.

Mechanism for horizontally reciprocating the racks 86, 86 is best illustrated in FIG. 6 and comprises pinion gears 92, 92 (one shown) associated respectively with the racks 86, 86 and mounted on a shaft 94. The shaft 94 is rotated by means of a small gear 96 in turn driven from a gear 98 on a stub shaft 100. The stub shaft 100 also carries a small pinion 102 driven by a rack 104 which in turn is reciprocated by an oscillatable lever 106. As best seen in FIG. 5B the lever 106 is carried on and oscillated by a shaft 108 and a cam follower 110 associated with a cam 112.

As will be apparent, the cam 112 effects operation of the lever 110, the lever 106 and the aforementioned racks and gears whereby to advance the case pusher plates 88, 88 carrying a single case from the hopper 76 to the case forming mechanism 82. As best illustrated in FIG. 7 additional case pushers and case pusher buttons and plates 88, 88 and 90, 90 are provided and similarly operated for advancing cases from the case forming mechanism to the aforesaid Assembly Station B, the case 74 shown at the lefthand portion of FIG. 7 in engagement with such an additional pusher button 90.

The case forming mechanism 82 includes a top case forming plate 114 which may be heated but which is preferably maintained in a cool condition in the present machine. A lower case forming iron or plate 116 is preferably heated by heater means 118 and is carried on a vertically movable slide 120. The slide 120 is movable for limited travel in a guideway 122 whereby to move the lower case forming iron or plate upwardly into and downwardly out of engagement with a case advanced to the forming mechanism by the right-hand pusher button 90 and pusher plate 82.

A crank arm 124 pivotally connected at 126 to the slide 120 is oscillated from a shaft 128 in turn oscillated by an arm 130 and a push rod 132. The push rod 132 is connected with an air cylinder 134, FIG. 5B, and more particularly, with a piston rod 136 thereof. The air cylinder 134 and the piston rod 136 are interposed between a cam lever 138 and the push rod 132 and the rod 136 is normally maintained in a fixed and extended position during operation of the casing-in machine. In the event that the casing-in machine is stopped in its operation with the hot forming iron 116 in engagement with a case; that is, with the push rod 132 in an upward position, then the piston rod 136 is permitted to retract within the cylinder whereby to withdraw the iron from engagement with the case and to prevent burning of the latter. A limit switch 140 associated with the air cylinder 134 serves after a predetermined time interval to permit air to be exhausted from the air cylinder and to effect such operation. For driving connection of the cam lever 138, a cam 142 is provided and has an associated follower lever 144 and a follower (not shown).

From the foregoing it will be apparent that cases are appropriately formed along their back portions and advanced successively to the Assembly Station B whereat fillers move upwardly in succession into engagement therewith. As a filler moves upwardly and engages a case such as the aforementioned case 74 at the Assembly Station B, the case folds downwardly thereabout as stated and is held in firm engagement and in precise registry with the filler by means of a book squaring device indicated generally at 141. The book squaring device 141 operates during a critical portion of the machine cycle, that is, the said device maintains precise case and filler registry immediately on assembly of the filler and case and as a book moves upwardly from the Assembly Station.

In accordance with the invention the book squaring device 41 comprises at least one book engaging element and, in the preferred embodiment of the invention, first and second book engaging elements 144, 144 are provided. The book engaging elements 144, 144 operate alternately to engage books or assembled cases and fillers as they are transported upwardly from the Assembly Station and each book engaging element travels a closed looped path upwardly with a book in a general vertical direction, horizontally outwardly, generally vertically downwardly, and then generally horizontally again to return to a lower or book engaging position. As best shown in FIG. 8A each of the book engaging elements 144, 144 comprises an elongated flat bar member which is urged downwardly by spring means 146, 146 into engagement with a central portion of a case assembled over a filler. Each book engaging element 144 is supported by at least one member extending laterally therefrom and, as shown, lateral slide rods 148, 148 are provided for support and horizontal sliding movement of the elements 144, 144. The slide rods 148, 148 associated with the upper book engaging element 144 (not shown) are substantially identical with the corresponding rods associated with the lower element 144 and carry a cam follower 150. An identical cam follower 150 is provided for the lower book engaging element 144. The cam follower 150 takes the form of an elongated member which is parallel with its corresponding book engaging element and which is mounted on and operable to effect sliding movement of the slide rods 148, 148.

A slide or slide assembly 152 is associated with and supports each book engaging element 144 and is adapted for vertical reciprocal movement on appropriate vertical slide rods 154, 154. Each cam follower 150 has associated therewith and at opposite ends thereof similar cam plates 156, 156 provides with cam tracks 158, 158 having spring biased gates 160 and 162 respectively at lower and upper ends thereof. The cam tracks 158 provide for the upward movement of the cam follower 150 along an inner portion 158a of the track and for downward movement of the follower along an outer portion of the track 158b. Thus, as a slide 152 moves upwardly on its guide and support rods 154, 154 a book engaging elements 144 associated therewith is held in a horizontal inward position to engage the central portion of the back of a case assembled on a filler. The said book engaging element is spring-biased downwardly into film engagement with the case as the associated follower 150 moves upwardly in the inner track portion 158a. At an upper end portion of the vertical reciprocal movement of the slide 152, the follower 150 moves generally horizontally outwardly in the cam track whereby to move the book engaging element generally horizontally outwardly and out of engagement with the book case. On subsequent downward movement of the slide assembly 152 the cam follower 150 follows the outer portion 158b of the cam track 158 whereupon to maintain the corresponding book engaging element 144 in an outer position until a lower end portion of the track is reached. At the lower end portion of the track the cam follower moves generally horizontally inwardly again whereby to move the book engaging element 144 inwardly for engagement with a succeeding case assembled on a filler. The alternate book engaging operation of the elements 144, 144 mentioned above provides for movement of the said elements in the manner of an "Australian Crawl."

In the preferred form of the present invention the slide assemblies 152, 152 are moved upwardly alternately under power as their corresponding book engaging elements operate on assembled cases and fillers. Each slide 152 preferably includes a pair of small pinions 164, 164 disposed at opposite ends thereof for engagement with racks 166, 166. The pinions and racks 164, 166 provide for proper horizontal alignment of the slide assemblies and for efficient reciprocation thereof as aforesaid. Vertical drive racks 168, 168 for the slides 152, 152 have associated pinions 170, 170 mounted on small stub shafts 172, 172 which in turn carry small pinions 174, 174 (one shown) meshing with pinions 176, 176. The pinions 176, 176 are driven by vertically reciprocal racks 178, 178 in turn operated by pivotally connected push rods 180, 180 and cam levers 182, 182. As best seen in FIG. 1B the cam levers 182, 182 are driven from cam follower levers 184 (one shown) and cams 186 (one shown). As will be apparent, the drive mechanisms for the slide assemblies 152, 152 are operated alternately from the cams 186, 186 to effect the aforementioned alternate or "Australian Crawl" operation of the book engaging elements 144, 144 of the book squaring device.

Book rub-down rolls 188, 188 are best illustrated in FIGS. 3 and 8A. As will be apparent, the book rub-down rolls are disposed on opposite sides of an assembled case and filler as it is transported upwardly from the book squaring device and they move inwardly into engagement with the sides of the case to effect a "rub-down" operation in a conventional manner. Each rub-down roll has an associated crank arm 190 which in turn has an associated shaft 192 and a gear segment 194. The gear segments 194, 194 interengage and the right-hand shaft 192 is driven in FIG. 3 by means of a gear 196 mounted thereon and a segment 198 on an arm 200 which is in turn driven by a rock shaft 202 which extends rearwardly in the machine to a cam lever 204 in FIG. 8A. A biasing spring 206 maintains a cam follower 208 in engagement with a cam 210 on a shaft 212 and the shaft 212 also carries a sprocket 214 which is in turn driven by a chain 216 best illustrated in FIG. 4. The chain 216 has a lower sprocket 218 and an upper driving sprocket 220 mounted on the aforementioned shaft 22. Thus, it will be seen that the rub-down rolls 180, 180 are adapted for synchonized operation in movement inwardly into engagement with an assembled case and filler and outwardly out of engagement with the sides thereof as the filler is conveyed upwardly therefrom.

On leaving the rub-down rolls 180, 180 assembled books and fillers are conveyed upwardly and then generally horizontally rightwardly as best illustrated in FIG. 2 to a right-hand generally vertical downward run or pass of the conveyor chain. A book discharge mechanism 222 is disposed in the right-hand generally vertically downward pass or run of the conveyor chain and operates successively to remove books or assembled cases and fillers from the saddle plates 10, 10 as they pass downwardly therethrough. Full description and operation of the book discharge mechanism is unnecessary for a full understanding of the present invention but reference may nevertheless be had to my copending U.S. application 571,847 filed Aug. 11, 1966 now Patent 3,362,521 issued Jan. 9, 1968 for any desired details of the said mechanism.

The invention claimed is:

1. The combination in a book casing-in machine comprising at least one saddle plate arranged in a substantially vertical plane and adapted to support a book filler thereon in a back-up attitude and astride an upper portion of the plate, a conveyor means for moving the saddle plate upwardly in a generally vertical path, an assembly station disposed in the path of filler movement and comprising a means for supporting a book case in a back-up attitude and in a generally flat condition to receive and fold downwardly about a filler conveyed upwardly on said saddle plate, and a book squaring device disposed adjacent said assembly station and including at least one book engaging element movable into an out of the path of book movement and movable vertically so as to engage and firmly press downwardly on a central and back portion of a case at the assembly station and along said path thereabove and thereby to maintain registry of the case assembly on the filler as the case and filler are conveyed upwardly away from said assembly station.

2. The combination in a book casing-in machine as set forth in claim 1 wherein said back squaring device includes means accommodating movement of said book engaging element in a closed loop path from an initial book engaging position adjacent said assembly station upwardly in engagement with the assembled case and filler, generally horizontally away from the aforesaid vertical path of case and filler movement and then generally vertically downwardly in a path spaced from the path of book movement, and finally generally horizontally again to return to said book engaging position.

3. The combination in a book casing-in machine as set forth in claim 2 and including a plurality of saddle plates arranged for successive movement in a spaced vertical series upwardly through said assembly station each with a filler thereon, and a means for advancing book cases to said assembly station in succession and in timed relationship with the upward movement of said saddle plates and fillers through said station, said book squaring device being operable in succession on assembled cases and fillers as they are conveyed upwardly from said assembly station.

4. The combination in a book casing-in machine as set forth in claim 3 wherein said book squaring device includes similar first and second book engaging elements and a means for operating said elements for closed loop movement as aforesaid and for alternate engagement with assembled cases and fillers as the latter are conveyed upwardly through and from said assembly station.

5. The combination in a book casing-in machine as set forth in claim 4 wherein said book squaring device includes first and second vertically movable slide assemblies associated respectively with said first and second book engaging elements, each said element being supported by its corresponding slide assembly for vertical movement therewith and for horizontal movement with respect thereto whereby to traverse the aforesaid vertical-horizontal closed loop path in its book engaging and squaring operation.

6. The combination in a book casing-in machine as set forth in claim 5 wherein each said vertically movable slide assembly has associated therewith a power operated means for effecting vertical reciprocation thereof in timed relationship with assembled fillers and cases as the latter are conveyed upwardly from said assembly station, said two power operated means effecting alternate vertical reciprocation of said slide assemblies for alternate engagement of their corresponding book engaging elements as aforesaid.

7. The combination in a book casing-in machine as set forth in claim 6 wherein each said slide assembly includes a cam follower connected with and operable to move the corresponding book engaging element horizontally, each said cam follower having an associated cam means operable to move the same generally horizontally whereby to move the corresponding book engaging element generally horizontally in opposite directions respectively at upper and lower end portions of the vertical reciprocal movement of the slide assembly, the book engaging element being thus moved inwardly into engagement with an assembled case and filler at the lower end portion of the vertical reciprocal movement of the slide assembly and outwardly and out of engagement with the case and filler at said upper end portion of the vertical reciprocal assembly movement.

8. The combination in a book casing-in machine as set forth in claim 7 wherein each said book engaging element takes the form of a generally flat horizontally elongated bar carried by at least one supporting member which extends laterally therefrom and which is held by the corresponding slide assembly for horizontal sliding movement effective to engage and disengage the book engaging element and an adjacent assembled filler and case, wherein each said cam follower comprises a horizontally elongated member parallel with the corresponding book engaging element and mounted on and operable to effect sliding movement of said laterally extending supporting member, and wherein each said cam means comprises first and second cam plates defining similar cam tracks, said cam plates being mounted respectively at opposite end portions of said cam follower such that the cam tracks therein respectively receive and guide opposite end portions of the follower.

9. The combination in a book casing-in machine as set forth in claim 8 wherein each said book engaging element is provided with biasing spring means for connecting the same with the corresponding laterally extending supporting element, said biasing spring means serving to urge said element resiliently downwardly into firm engagement with a central portion of an assembled filler and case thereunder.

10. The combination in a book casing-in machine as set forth in claim 9 wherein said conveyor means comprises at least one endless chain movable through a generally rectangular horizontal-vertical path in a vertical plane and having a vertically ascending run thereof arranged to pass through said assembly station, and wherein said saddle plates are arranged in a spaced series along said chain and are pivotally attached in cantilever fashion at upper portions to the chain so as to depend therefrom continuously in a substantially vertical plane.

References Cited

UNITED STATES PATENTS

| | | | |
|---|---|---|---|
| 1,454,299 | 5/1923 | Strom | 11—3 |
| 1,765,349 | 6/1930 | Schramm et al. | 11—3 |
| 3,009,180 | 11/1961 | Schramm | 11—3 |
| 3,201,810 | 8/1965 | Thorp | 11—3 |

LAWRENCE CHARLES, *Primary Examiner.*